US012093522B2

(12) United States Patent
Dou et al.

(10) Patent No.: US 12,093,522 B2
(45) Date of Patent: Sep. 17, 2024

(54) CONTEXT-AWARE ANTENNA TUNING

(71) Applicant: Meta Platforms Technologies, LLC, Menlo Park, CA (US)

(72) Inventors: Weiping Dou, Cupertino, CA (US); Ulf Jan Ove Mattsson, Campbell, CA (US); Yonghua Wei, San Diego, CA (US); Chilin Hsu, San Jose, CA (US); Geng Ye, Union City, CA (US); Jiang Zhu, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 46 days.

(21) Appl. No.: 17/933,814

(22) Filed: Sep. 20, 2022

(65) Prior Publication Data

US 2024/0094894 A1 Mar. 21, 2024

(51) Int. Cl.
*G06F 3/048* (2013.01)
*G06F 3/0484* (2022.01)
*G06F 3/0488* (2022.01)

(52) U.S. Cl.
CPC .......... *G06F 3/0488* (2013.01); *G06F 3/0484* (2013.01)

(58) Field of Classification Search
CPC .............................. G06F 3/0488; G06F 3/0484
See application file for complete search history.

(56) References Cited

U.S. PATENT DOCUMENTS

| 10,191,574 | B2* | 1/2019 | Shin | H04M 1/05 |
| 2009/0059730 | A1* | 3/2009 | Lyons | G04G 21/08 368/69 |
| 2015/0105125 | A1* | 4/2015 | Min | H04M 1/21 455/566 |
| 2018/0129334 | A1* | 5/2018 | Bostick | G06F 3/04817 |
| 2019/0213037 | A1* | 7/2019 | Kim | G06F 3/0486 |
| 2019/0257933 | A1* | 8/2019 | Nath | H01Q 21/064 |
| 2020/0371598 | A1* | 11/2020 | Sadarangani | A61B 5/0295 |
| 2021/0169417 | A1* | 6/2021 | Burton | A61B 5/4857 |
| 2021/0345912 | A1* | 11/2021 | Zakharov | A61B 3/113 |
| 2022/0192524 | A1* | 6/2022 | Leabman | A61B 5/681 |

* cited by examiner

*Primary Examiner* — Linh K Pham
(74) *Attorney, Agent, or Firm* — Greenberg Traurig, LLP

(57) ABSTRACT

The disclosed computer-implemented method may include accessing various portions of contextual information based on at least one touch input from a touch-based sensor on a mobile electronic device. The method may next include determining, based on the contextual information, which of different operational antenna parameters associated with at least one antenna of the mobile electronic device are to be changed. The method may then include changing the specified operational parameters associated with the antenna on the mobile electronic device according to the determination. Various other methods, systems, and computer-readable media are also disclosed.

19 Claims, 12 Drawing Sheets

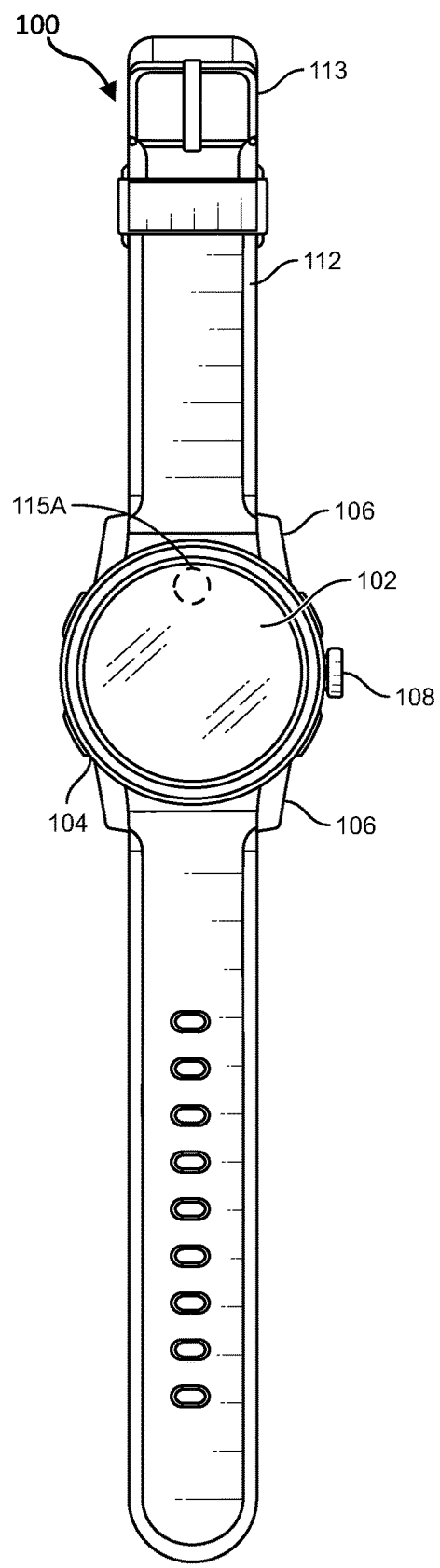
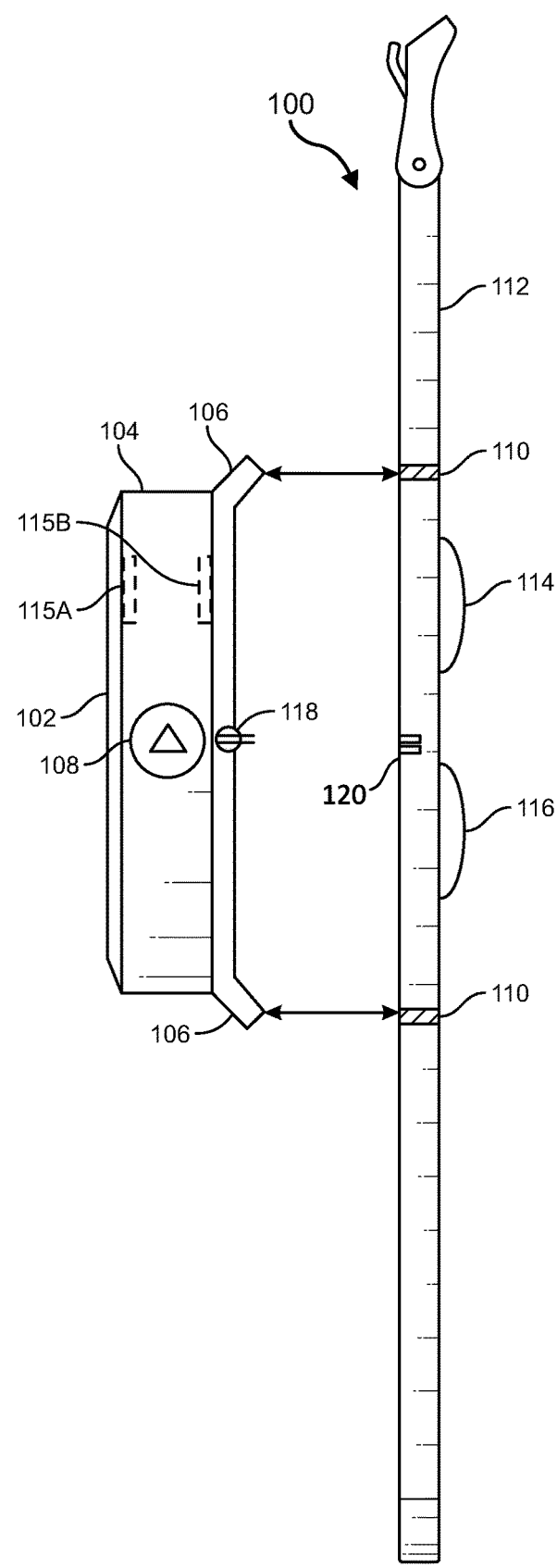
*FIG. 1A*  *FIG. 1B*

CONTEXT-AWARE ANTENNA TUNING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1A is a plan view of an example wristband system, according to at least one embodiment of the present disclosure.

FIG. 1B is a side view of the example wristband system of FIG. 1A, according to at least one embodiment of the present disclosure.

Figure 2A:
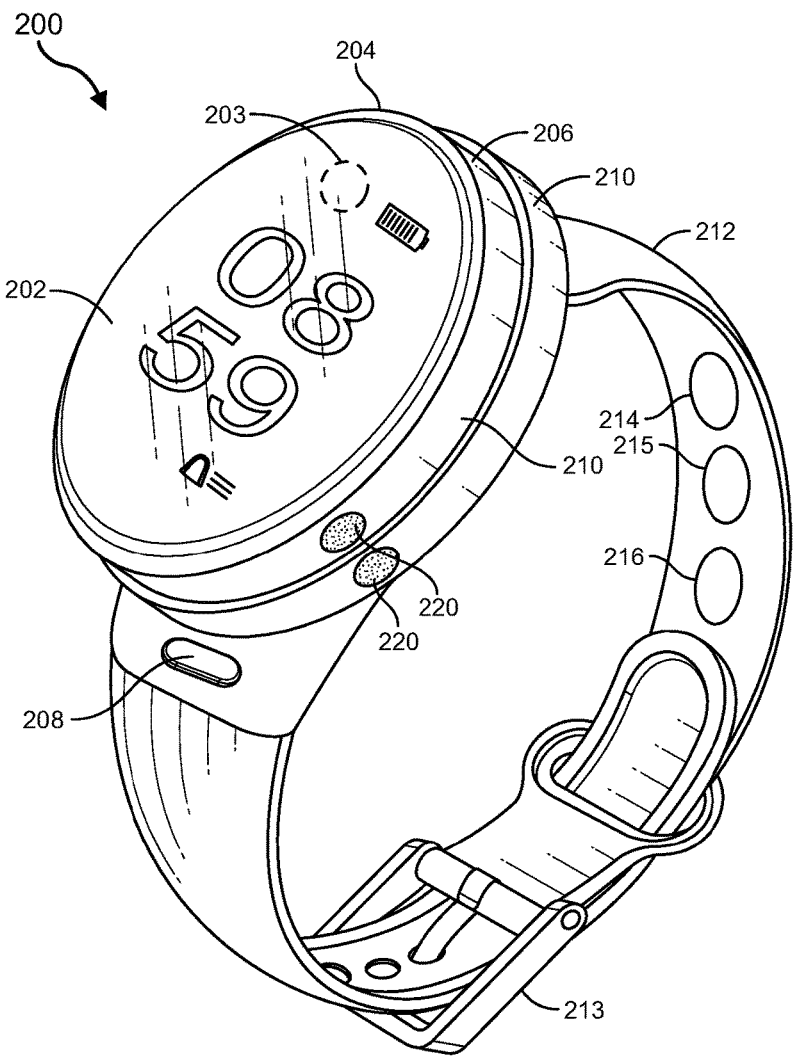
FIG. 2A is a perspective view of an example wristband system, according to at least one embodiment of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure provides systems, methods, and devices for evaluating environmental and contextual cues and dynamically modifying wireless architectures to optimize performance. Past mobile devices were designed to operate in a uniform manner, regardless of who was holding the device, how they were holding the device, or which environment the device was currently in. The present disclosure aims to personalize the wireless functionality of each mobile device to the device's current user. As such, depending on how the user holds the mobile device, how the user uses their mobile device or, more specifically, how the user wears their watch, augmented reality (AR) glasses, or virtual reality (VR) headset, the mobile device itself may operate differently and may dynamically change based on external conditions.

The embodiments described herein may receive multiple different inputs, including environmental inputs, inputs from touchscreens or other sensors, or other inputs, and then dynamically switch between antennas, retune antennas, or change other antenna properties based on the inputs. In one example, for instance, a user may take a one-handed photo or two-handed photo with a detached smartwatch capsule, after which the user may place the capsule back onto the smartwatch's watchband. In such cases, the systems herein may continually determine, for each change in use or change in environment, which antenna architecture or which antenna operational parameters would be optimal for that device in that moment. The determined changes may then be applied to the mobile device in real time. In some embodiments, online or offline artificial intelligence (AI) or machine learning (ML) models may be used to determine when and how to change the antennas, when to change tuner state, when and how to perform beam steering, or when or how to make other optimizations in the device's wireless functionality. In this manner, the mobile device may continually alter aspects of its antenna architecture to operate in the most efficient manner for that environment or use case.

While many of the embodiments described herein are directed to a smart watch, it will be recognized that these same principles may be applied to AR glasses (e.g., 910 of FIG. 9), to virtual reality headsets (e.g., 1000 of FIG. 10), or to other mobile electronic devices. For example, the dynamic tuning embodiments described herein may be used in AR glasses when the user puts the glasses on their head, or in a VR device when the user mounts the head-mounted display. Accordingly, while smartwatches are primarily described herein, it will be understood that substantially any device that includes at least one antenna (e.g., a smartphone, a tablet, an internet of things (IoT) device, a wearable electronic device, an AR/VR device, or other mobile device) may implement the embodiments described herein.

Features from any of the embodiments described herein may be used in combination with one another in accordance with the general principles described herein. These and other embodiments, features, and advantages will be more fully understood upon reading the following detailed description in conjunction with the accompanying drawings and claims.

Mobile electronic devices often use many different types of antennas for communication on different frequency bands. For instance, current smartwatches may implement wide- and multi-band long-term evolution (LTE), global positioning system (GPS), wireless fidelity (WiFi), Bluetooth™, near field communication (NFC), or other types of antennas. These different types of antennas may provide long- and short-range communications with other electronic devices and with networks such as cellular networks or the internet.

However, as mobile devices become ever smaller, the amount of space available for these different types of antennas may be limited. Moreover, because of the small size, the amount of bandwidth achievable on any given antenna may be limited. Still further, because mobile devices such as smartwatches are often designed with metal enclosures, placing multiple different types of antennas in different locations where they can receive sufficient operational signal strength may be complicated. In some instances, the size of the mobile device may be increased to accommodate larger antennas. This increased size may, at least in some cases, improve antenna bandwidth and efficiency. However, larger sizes for smartwatches and other mobile devices may be less desirable, as additional weight and bulk in a mobile (especially wearable) device are typically unwanted. Still further, having a metal enclosure may limit how and where different types of antennas may be placed and operated within a mobile device.

As noted above, wearable devices may be configured to be worn on a user's body, such as on a user's wrist or arm. Such wearable devices may be configured to perform a variety of functions. A wristband system, for example, may be an electronic device worn on a user's wrist that performs functions such as delivering content to the user, executing social media applications, executing artificial-reality applications, messaging, web browsing, sensing ambient conditions, interfacing with head-mounted displays, monitoring the health status associated with the user, etc. In some examples, a wristband system may include a watch band that detachably couples to a watch body. The watch body may include a coupling mechanism for electrically and mechanically coupling the watch body (e.g., the enclosure or capsule) to the watch band (e.g., the cradle). At least in some cases, the wristband system may have a split architecture that allows the watch band and the watch body to operate both independently and in communication with one another. The mechanical architecture may include a coupling mechanism on the watch band and/or the watch body that allows a user to conveniently attach and detach the watch body from the watch band.

The wristband system of FIGS. 1A and 1B, for example, may be used in isolation or in conjunction with other systems including artificial-reality (AR) systems. Sensors of the wristband system (e.g., image sensors, inertial measurement units (IMUS), etc.) may be used, for example, to enhance an AR application running on the AR system. Further, the watch band may include sensors that measure biometrics of the user. For example, the watch band may include neuromuscular sensors (e.g., neuromuscular sensors 1810 of FIG. 18A) disposed on an inside surface of the watch band contacting the user that detects the muscle intentions of the user. The AR system may include a head-mounted display that is configured to enhance a user interaction with an object within the AR environment based on the muscle intentions of the user. Signals sensed by the neuromuscular sensors may be processed and used to provide a user with an enhanced interaction with a physical object and/or a virtual object in an AR environment. For example, the AR system may operate in conjunction with the neuromuscular sensors to overlay one or more visual indicators on or near an object within the AR environment such that the user could perform "enhanced" or "augmented" interactions with the object.

Figure 2B:
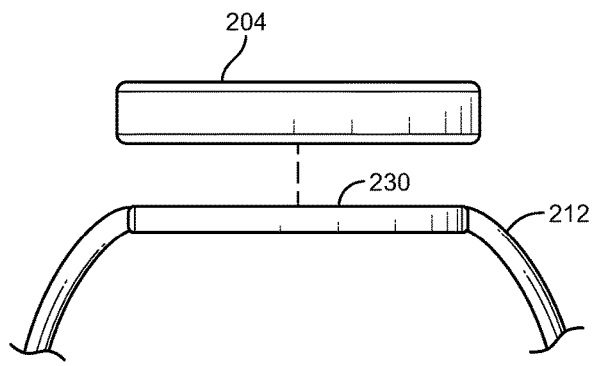
FIG. 2B is a side view of another example wristband system, according to at least one embodiment of the present disclosure.
Figure 2C:
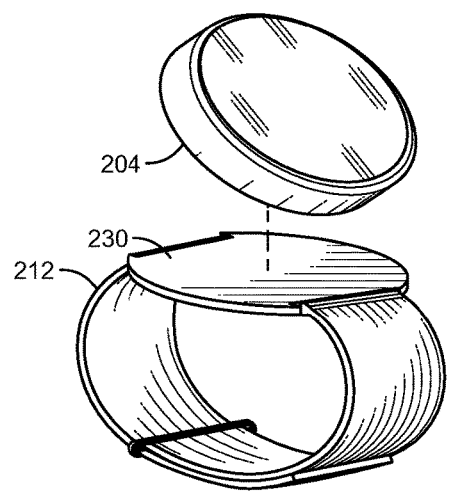
FIG. 2C is a perspective view of another example wristband system, according to at least one embodiment of the present disclosure.

FIGS. 1A and 1B illustrate an embodiment of a wristband system including a watch band and a watch body. In some cases, neuromuscular sensors may be integrated within the wristband system, as shown in FIGS. 2A, 2B, and 2C. FIG. 1A illustrates an example wristband system 100 that includes a watch body 104 coupled to a watch band 112. Watch body 104 and watch band 112 may have any size and/or shape that is configured to allow a user to wear wristband system 100 on a body part (e.g., a wrist). Wristband system 100 may include a retaining mechanism 113 (e.g., a buckle) for securing watch band 112 to the user's wrist. Wristband system 100 may also include a coupling mechanism 106, 110 for detachably coupling watch body 104 to watch band 112. Still further, the wristband system 100 may include a button or wheel 108 that allows users to interact with the wristband system 100 including applications that run on the system.

Wristband system 100 may perform various functions associated with the user. The functions may be executed independently in watch body 104, independently in watch band 112, and/or in communication between watch body 104 and watch band 112. Watch band 112 and its associated antennas may be configured to operate independently (e.g., execute functions independently) from watch body 104. Additionally or alternatively, watch body 104 and its associated antennas may be configured to operate independently (e.g., execute functions independently) from watch band 112. At least in some cases, watch band 112 and/or watch body 104 may each include the independent resources required to independently execute functions. For example, watch band 112 and/or watch body 104 may each include a power source (e.g., a battery), a memory, data storage, a processor (e.g., a CPU), communications (including multiple different types of antennas), a light source (e.g., at least one infrared LED for tracking watch body 104 and/or watch band 112 in space with an external sensor), and/or input/output devices.

FIG. 1B illustrates an example wristband system 100 that includes a watch body 104 decoupled from a watch band 112. Watch band 112 may be donned (e.g., worn) on a body part (e.g., a wrist) of a user and may operate independently from watch body 104. For example, watch band 112 may be configured to be worn by a user and an inner surface of watch band 112 may be in contact with the user's skin. When worn by a user, sensor 114 may be in contact with the user's skin. Sensor 114 may be a biosensor that senses a user's heart rate, bioimpedance, saturated oxygen level, temperature, sweat level, muscle intentions, steps taken, or a combination thereof. Watch band 112 may include multiple sensors 114 and 116 that may be distributed on an inside surface, in an interior volume, and/or on an outside surface of watch band 112. In some examples, watch body 104 may include an electrical connector 118 that mates with connector 120 of watch band 112 for wired communication and/or power transfer. In some examples, as will be described further below, watch body 104 and/or watch band 112 may include wireless communication devices including LTE antennas, GPS antennas, Bluetooth antennas, WiFi antennas, NFC antennas, or other types of antennas.

Wristband system 100 may include a coupling mechanism for detachably coupling watch body 104 to watch band 112. A user may detach watch body 104 from watch band 112 in order to reduce the encumbrance of wristband system 100 to the user. Detaching watch body 104 from watch band 112 may reduce a physical profile and/or a weight of wristband system 100. Wristband system 100 may include a watch body coupling mechanism(s) 106 and/or a watch band coupling mechanism(s) 110. A user may perform any type of motion to couple watch body 104 to watch band 112 and to decouple watch body 104 from watch band 112. For example, a user may twist, slide, turn, push, pull, or rotate watch body 104 relative to watch band 112, or a combination thereof, to attach watch body 104 to watch band 112 and to detach watch body 104 from watch band 112.

As illustrated in FIG. 1B, in some examples, watch body 104 may include front-facing image sensor 115A and rear-facing image sensor 115B. Front-facing image sensor 115A may be located in a front face of watch body 104 (e.g., substantially near, under, or on the display 102), and rear-facing image sensor 115B may be located in a rear face of watch body 104. In some examples, a level of functionality of at least one of watch band 112 or watch body 104 may be modified when watch body 104 is detached from watch band 112. The level of functionality that may be modified may include the functionality of front-facing image sensor 115A and/or rear-facing image sensor 115B. Alternatively, the level of functionality may be modified to change how the various antennas within the system. For instance, as will be described further below, the embodiments herein may include a cosmetic RF transparent feature that may form a functional link between wrist strap antennas and internal electronic components including tuners, amplifiers, controllers, and data processors.

FIG. 2A illustrates a perspective view of an example wristband system 200 that includes a watch body 204 decoupled from a watch band 212. Wristband system 200 may be structured and/or function similarly to wristband system 100 of FIGS. 1A and 1B. Watch body 204 and watch band 212 may have a substantially rectangular or circular shape and may be configured to allow a user to wear wristband system 200 on a body part (e.g., a wrist). Wristband system 200 may include a retaining mechanism 213 (e.g., a buckle, a hook and loop fastener, etc.) for securing watch band 212 to the user's wrist. Wristband system 200 may also include a coupling mechanism 208 for detachably coupling watch body 204 to watch band 212. The watch body 204 may include an enclosure 206 that houses various electronic components. In some cases, the watch body 204 may be referred to as a "capsule."

Wristband system 200 may perform various functions associated with the user as described above with reference to FIGS. 1A and 1B. The functions executed by wristband system 200 may include, without limitation, display of visual content to the user (e.g., visual content displayed on display screen 202), sensing user input (e.g., sensing a touch on a touch bezel 210 or on a physical button, sensing biometric data on sensor 214, sensing neuromuscular signals on neuromuscular sensors 215 or 216, sensing audio input via microphones 220, etc.), messaging (e.g., text, speech, video, etc.), image capture (e.g., with a front-facing image sensor 203 and/or a rear-facing image sensor), wireless communications (e.g., cellular, near field, WiFi, personal area network, etc.), location determination, financial transactions, providing haptic feedback, alarms, notifications, biometric authentication, health monitoring, sleep monitoring, etc. These functions may be executed independently in watch body 204, independently in watch band 212, and/or in communication between watch body 204 and watch band 212. Functions may be executed on wristband system 200 in conjunction with an artificial-reality system such as the artificial-reality systems described in FIGS. 9 and 10.

Watch band 212 may be configured to be worn by a user such that an inner surface of watch band 212 may be in contact with the user's skin. When worn by a user, sensor 214 may be in contact with the user's skin. Sensor 214 may be a biosensor that senses a user's heart rate, saturated oxygen level, temperature, sweat level, muscle intentions, or a combination thereof. Watch band 212 may include multiple sensors 214 that may be distributed on an inside and/or an outside surface of watch band 212. Additionally or alternatively, watch body 204 may include the same or different sensors than watch band 212. For example, multiple sensors may be distributed on an inside and/or an outside surface of watch body 204 or on the surface of the wrist straps. The watch body 204 may include, without limitation, front-facing image sensor 115A, rear-facing image sensor 115B, a biometric sensor, an IMU, a heart rate sensor, a saturated oxygen sensor, a neuromuscular sensor(s), an altimeter sensor, a temperature sensor, a bio-impedance sensor, a pedometer sensor, an optical sensor, a touch sensor, a sweat sensor, etc.

Watch band 212 may transmit the data acquired by sensor 214 to watch body 204 using a wired communication method (e.g., a UART, a USB transceiver, etc.) and/or a wireless communication method (e.g., near field communication, Bluetooth™, etc.). Watch band 212 may be configured to operate (e.g., to collect data using sensor 214) independent of whether watch body 204 is coupled to or decoupled from watch band 212. In some examples, watch band 212 may include a neuromuscular sensor 215 (e.g., an electromyography (EMG) sensor, a mechanomyogram (MMG) sensor, a sonomyography (SMG) sensor, etc.). Neuromuscular sensor 215 may sense a user's muscle intention. Neuromuscular sensor 215 may include neuromuscular sensor 1810 of FIG. 18A.

FIG. 2B is a side view and FIG. 2C is a perspective view of another example wristband system. The wristband systems of FIGS. 2B and 2C may include a watch body interface 230 or "cradle." Watch body 204 may be detachably coupled to watch body interface 230. In additional examples, one or more electronic components may be housed in watch body interface 230 and one or more other electronic components may be housed in portions of watch band 212 away from watch body interface 230.

The following will provide, with reference to FIGS. 3-10, detailed descriptions of systems and wearable electronic devices that adaptively tune wireless antennas based on environmental and contextual information. Features from any of the embodiments described herein may be used in combination with one another in accordance with the general principles described herein. These and other embodiments, features, and advantages will be more fully understood upon reading the following detailed description in conjunction with the accompanying drawings and claims.

Figure 3:
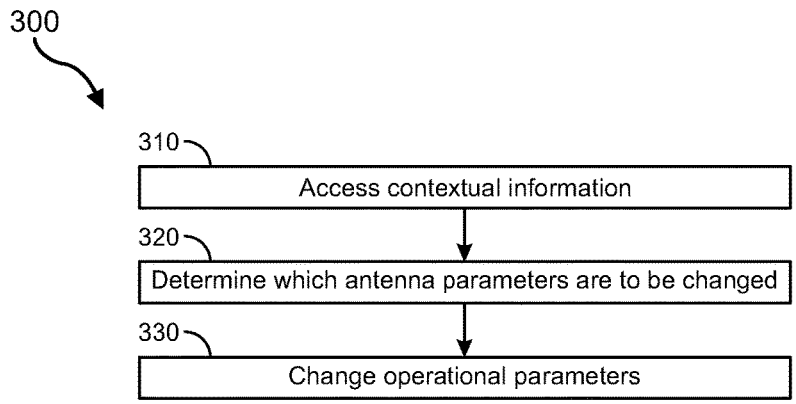
FIG. 3 is a flow diagram of an exemplary method for adaptively tuning antennas based on current contextual information.

FIG. 3 is a flow diagram of an exemplary computer-implemented method 300 for adaptively tuning antennas based on current contextual information. The steps shown in FIG. 3 may be performed by any suitable computer-executable code and/or computing system, including the systems illustrated in the figures. In one example, each of the steps shown in FIG. 3 may represent an algorithm whose structure includes and/or is represented by multiple sub-steps, examples of which will be provided in greater detail below.

Figure 4A:
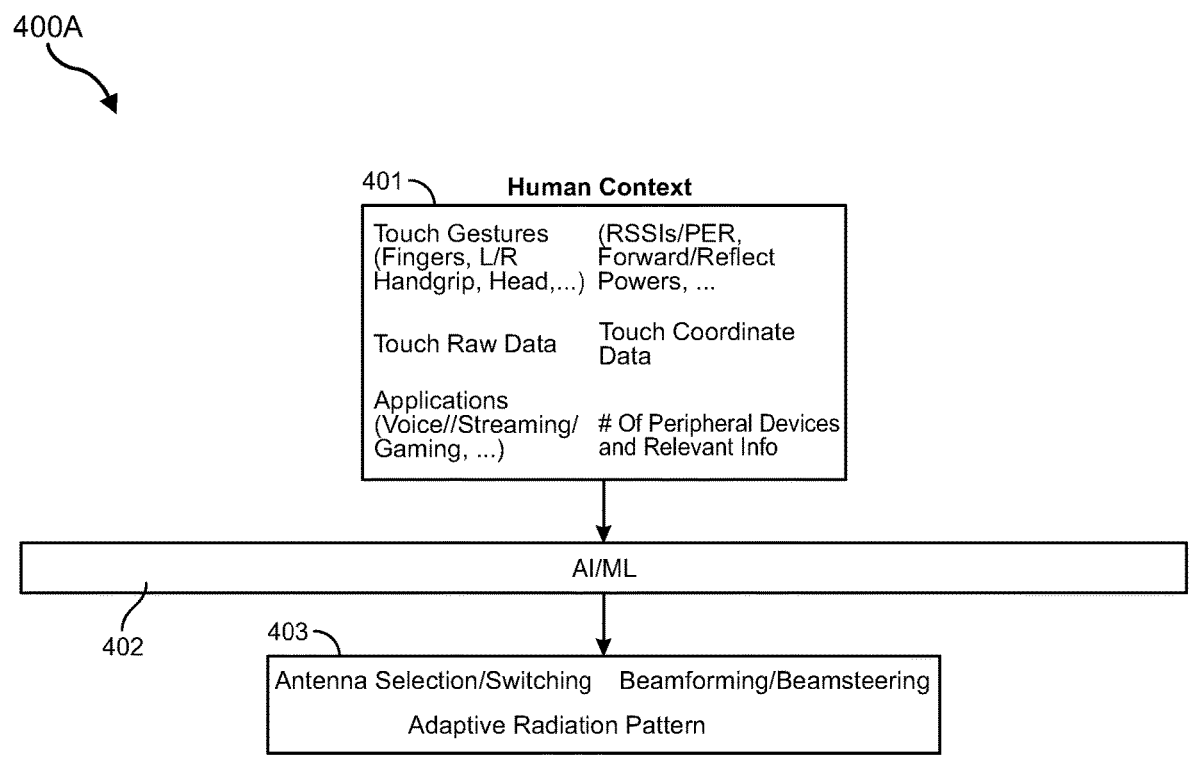
FIGS. 4A-4D illustrate embodiments in which various types of contextual information are implemented to adaptively tune an antenna architecture.
Figure 4B:
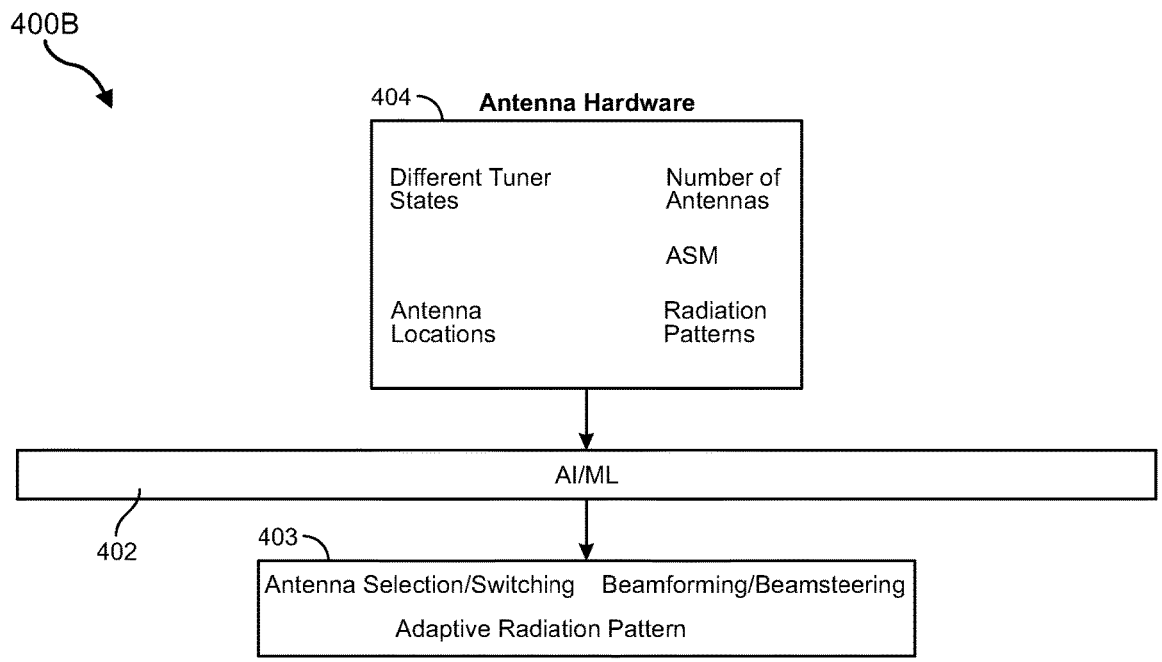
Figure 4C:
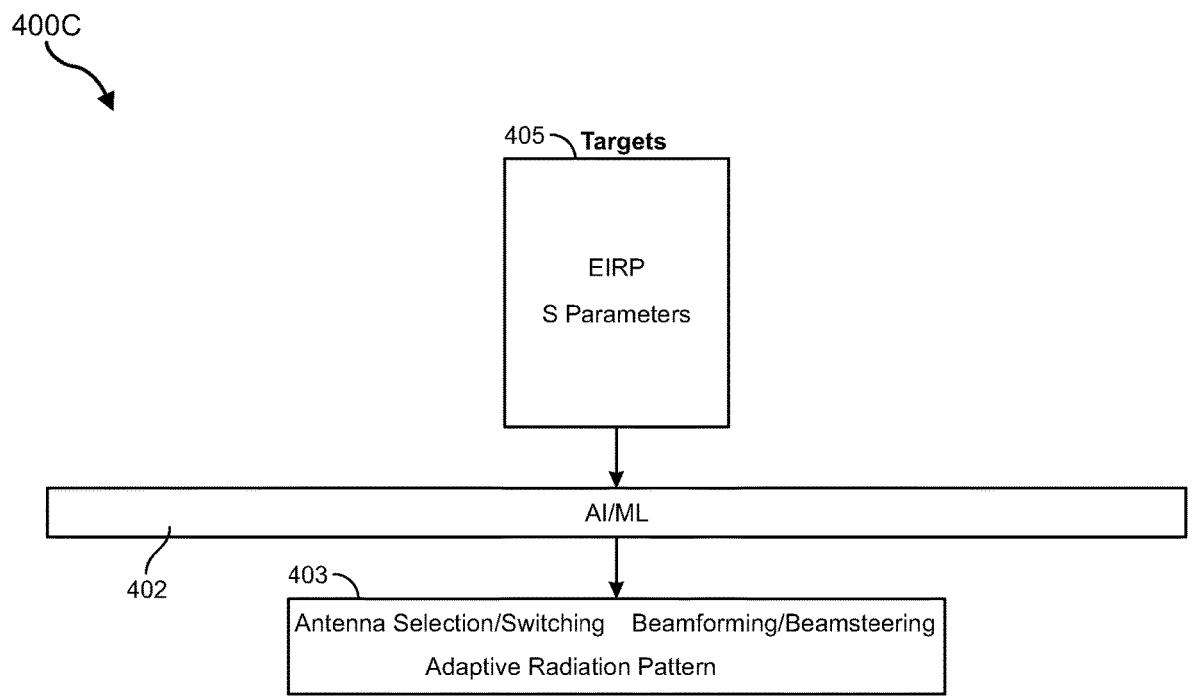
Figure 4D:
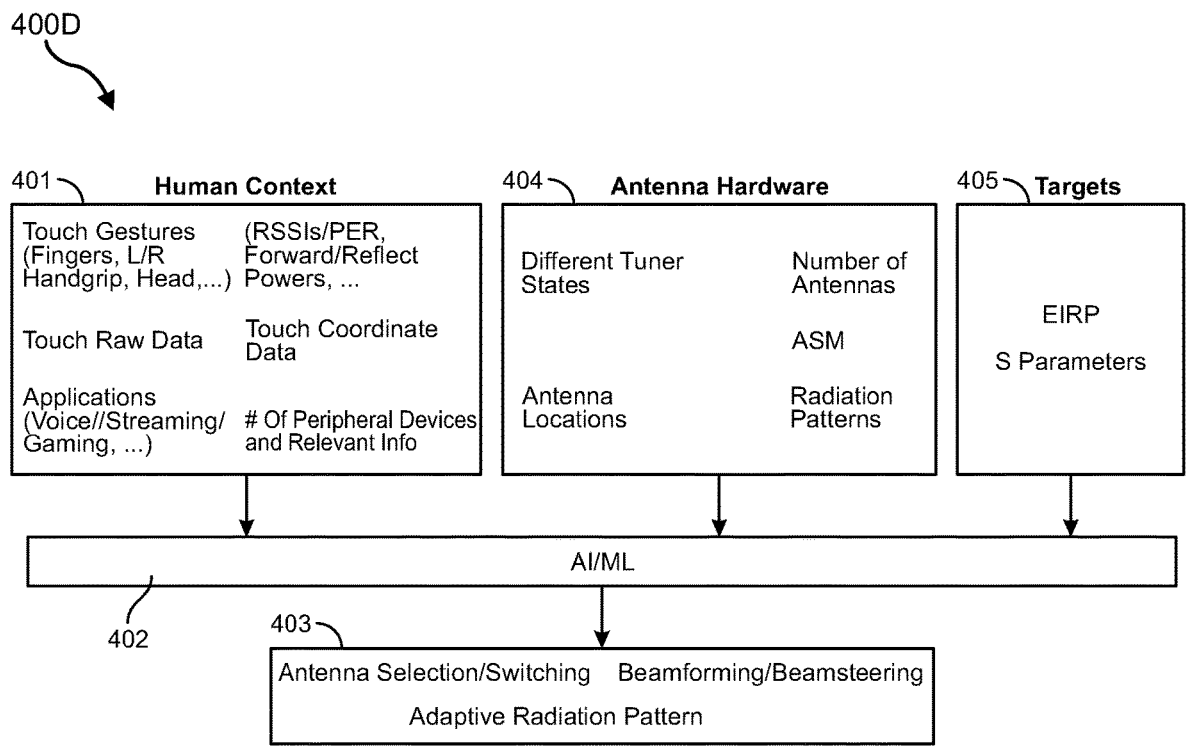

Step 310 of method 300 may include accessing one or more portions of contextual information including at least one touch input from a touch-based sensor on a mobile electronic device. As noted above, the mobile electronic device may be a smartwatch, smartphone, AR or VR device, or other mobile device. The contextual information may include many different types of information, as generally shown in FIGS. 4A-4D. Broadly speaking, this contextual information may include human context information 401, antenna hardware information 404, antenna target information 405, or other types of information. Each of these broad categories may be accessed individually, as shown in FIGS. 4A-4C, or may be accessed collectively, as shown in embodiment 400D of FIG. 4D. That information may then be used when determining how to change various antenna operational parameters.

FIG. 4A illustrates an embodiment 400A in which contextual information may include human context information 401 including, among other things, touch gestures. These touch gestures may include indications of a single finger touching the mobile electronic device, multiple fingers touching the device, an indication of how the fingers are arranged relative to each other, an indication of the order in which the fingers touched the device, or an indication of whether the user is touching the device's touchscreen, the device's bezel (or outer enclosure), or is touching a different touch sensor on the device. The human context information 401 may also include raw touch data indicating where the user is currently touching the device (e.g., touch coordinate data) and/or where the user has touched the device in the past, including patterns of holding the device. Still further, the human context information 401 may include application data indicating which application(s) are currently running on the device, and/or which applications have been run in the past. The human context information 401 may also include received signal strength indicators (RSSIs) that provide a measurement of the power present in a received wireless signal. Other information, including the number of peripheral devices connected to the mobile device, the manufacturer type and model of those peripheral devices, or other information may also be included in the human context information 401.

FIG. 4B illustrates an embodiment 400B in which antenna hardware information 404 is implemented when determining which antenna operational parameters are to be changed based on current context. The antenna hardware information 404 may include different tuner states. For instance, the mobile device may include many different types of antennas including cellular (e.g., long term evolution (LTE), 5G, 6G, etc.), WiFi, Bluetooth, global positioning system (GPS), near-field communication (NFC), ultrawideband (UWB), or other antennas. Each of these antennas may have its own tuners, and each of those tuners may have its own current tuning state. This tuning state may indicate how each particular antenna is tuned (e.g., using impedance matching tuning). This tuning state may then be changed if needed.

The antenna hardware information 404 may also include a number of antennas (and/or a number of each type of antenna in cases where multiple antennas of a given type exist on the device), as well as an indication of the location of those antennas (e.g., near a smartwatch display, in the middle of the smartwatch (e.g., on a PCB), on a bottom layer of the smartwatch (e.g., on a sensor layer), etc.). The antenna hardware information 404 may further include antenna system monitor (ASM) information that provides an indication of how the antenna is performing, as well as an indication of each antenna's current radiation patterns (e.g., whether or how beamforming is being applied). These and other types of antenna hardware information may be used when determining which antenna parameters to modify.

FIG. 4C illustrates an embodiment 400C in which antenna target information 405 may be used when determining which antenna operational parameters to change in a given mobile device. For instance, the antenna target information 405 may include an indication of effective isotropic radiated power (EIRP). This EIRP may indicate the maximum amount of power that is permitted to be radiated by a given antenna. For instance, many governmental entities limit the EIRP of antennas placed next to a user's head. As such, EIRP target data may be used to limit the amount of power any given antenna is radiating. Still further, the antenna target information 405 may include S parameter information including S11 (signal return loss), S21 (signal insertion loss), or other S parameters. This antenna target information 405 may be used when determining which antenna operational parameters to change in a given situation.

In some embodiments, an artificial intelligence (AI) or machine learning (ML) layer 402 may be implemented when determining (at step 320 of method 300), based on the contextual information, which specified operational parameters associated with at least one antenna of the mobile electronic device are to be changed. The AI/ML layer 402 may include discrete AI/ML processors, or may include general processors. The processors may be on the mobile electronic device directly, may be remote to the mobile device, or may be partially on the mobile device and partially remote (this will be explained in greater detail below with regard to FIG. 8). As shown in FIGS. 4A-4D, any or all of this contextual information (e.g., 401, 404, or 405) or other contextual information (e.g., current weather, current environment (e.g., indoor, outdoor), ambient light level, ambient noise level, etc.) may be used when determining which antenna parameters to change, when to change those parameters, and how much to change those operating parameters.

At step 330 of method 300, the mobile electronic device may change the identified operational parameters associated with the at least one antenna on the mobile device according to the determination. Thus, as shown in element 403, the mobile electronic device may select between different antennas (e.g., turning antennas off or turning antennas on), may turn on beamforming or turn it off for a given antenna, or may change how the beamforming is being performed (e.g., changing beamforming parameters), may adaptively change radiation patterns or radiating power, may dynamically change antenna tuning (e.g., by changing input impedance or by changing antenna grounding locations), or may change other antenna parameters.

In this manner, the systems herein may personalize and individualize each mobile device to operate optimally for each user. The systems herein may account for how the device is held, where the device is worn, which antennas are primarily used, which applications are primarily used, which antennas struggle to perform effectively, and which antennas continually perform at baseline or higher. Any or all of this information may be used to continuously monitor and update the performance of each antenna on the device, based on how the user is using their device. As such, each device's antenna performance may be tailored to each individual, providing each person's device optimal performance in the environments and in the ways they use the device.

Figure 5A:
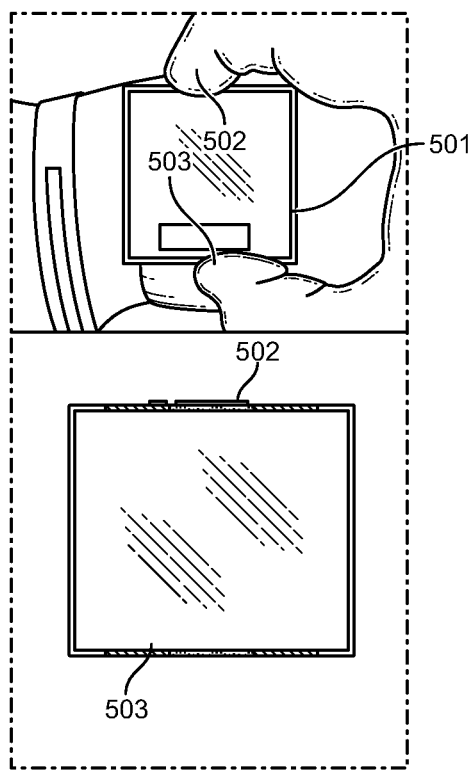
FIGS. 5A-5E illustrate embodiments in which different hand positions may affect how an antenna architecture is tuned.

FIGS. 5A-5E illustrate embodiments in which a user is touching a smartwatch in different locations. As a user's fingers may interfere with an antenna's performance by absorbing some or all of its radiated signal, an indication of where the user is touching the device may be implemented when determining which changes to make to an antenna's operating parameters. For instance, as shown in FIG. 5A, the user may touch the bezel of the smartwatch 501 at locations 502 and 503. The smartwatch 501 may then determine which antennas are positioned at locations 502 and 503. If, for example, an LTE antenna is positioned at location 502, and a GPS antenna is positioned at location 503, the smartwatch 501 may communicate with one or more amplifiers in the antennas' respective antenna feeds to increase the transmitting power while the user is touching those positions. Additionally or alternatively, the smartwatch 501 may determine that the user's fingers may be detuning the antennas at locations 502 and/or 503. In such cases, the smartwatch 501 may determine (e.g., based on S parameters) the extent of the detuning and may proactively and dynamically retune the respective antennas accordingly.

In some cases, the user's fingers at locations 502 and 503 may represent an input gesture that may be mapped to a particular function (e.g., taking a picture or making a mobile purchase). The smartwatch 501 may note how often such gestures are made and, at least in some cases, may anticipate or predict such actions in certain scenarios (e.g., at a particular time of day or in a particular location). In such cases, the smartwatch 501 may make anticipatory changes to the antennas at locations 502 and/or 503 so that when the gesture is made, the antennas at those locations may have adjusted tunings or may have adjusted power or beamforming parameters. As such, predictive and anticipatory antenna tuning may be applied based on which actions are likely to be performed and specifically in a given context or environment.

Figure 5B:
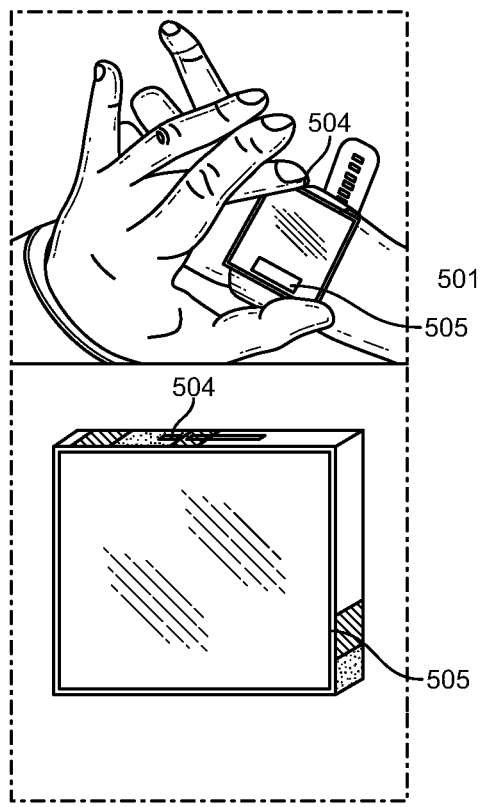
Figure 5C:
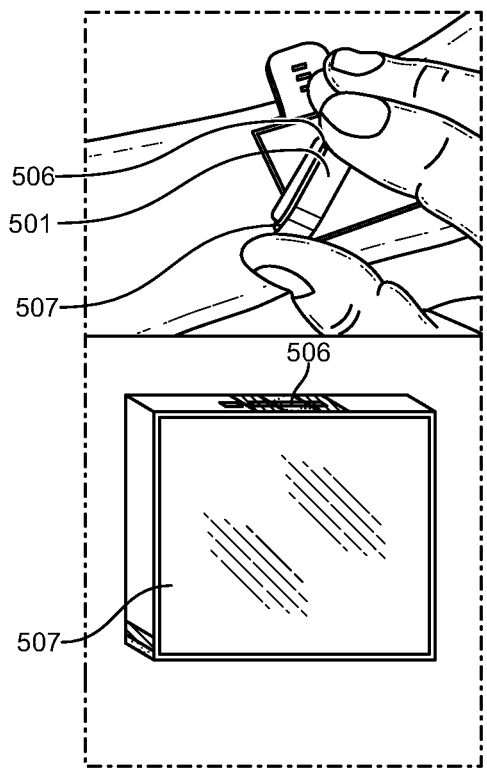
Figure 5D:
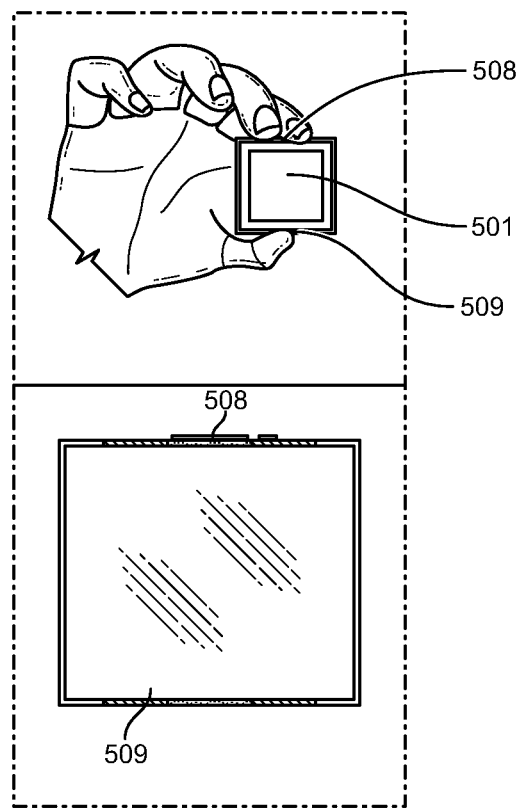
Figure 5E:
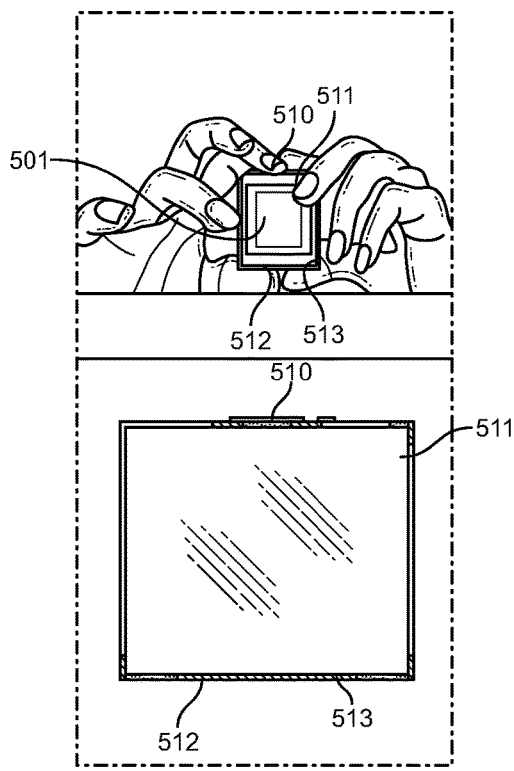

FIGS. 5B-5E illustrate alternate embodiments in which the smartwatch 501 is touched, held, or interacted with in different manners. As noted above, the touch locations may correspond to gestures, or may simply provide selection or other inputs to the smartwatch. FIG. 5B illustrates touches at locations 504 and 505, while FIG. 5C shows touches at locations 506 and 507 in an embodiment where the bezel of the smartwatch has been detached from the wristband (as described above with regard to FIGS. 1A-2C). Still further, FIG. 5D illustrates touches at positions 508 and 509, while FIG. 5E illustrates touches at locations 510, 511, 512, and 513. Accordingly, the embodiments herein contemplate substantially any number of touches anywhere on the smartwatch 501. In some cases, the touches are on the bezel or enclosure, while in other cases, the touches are on the touchscreen display, while in still other cases, the touches are on different touch sensors, or on any combination of the above.

Figure 6:
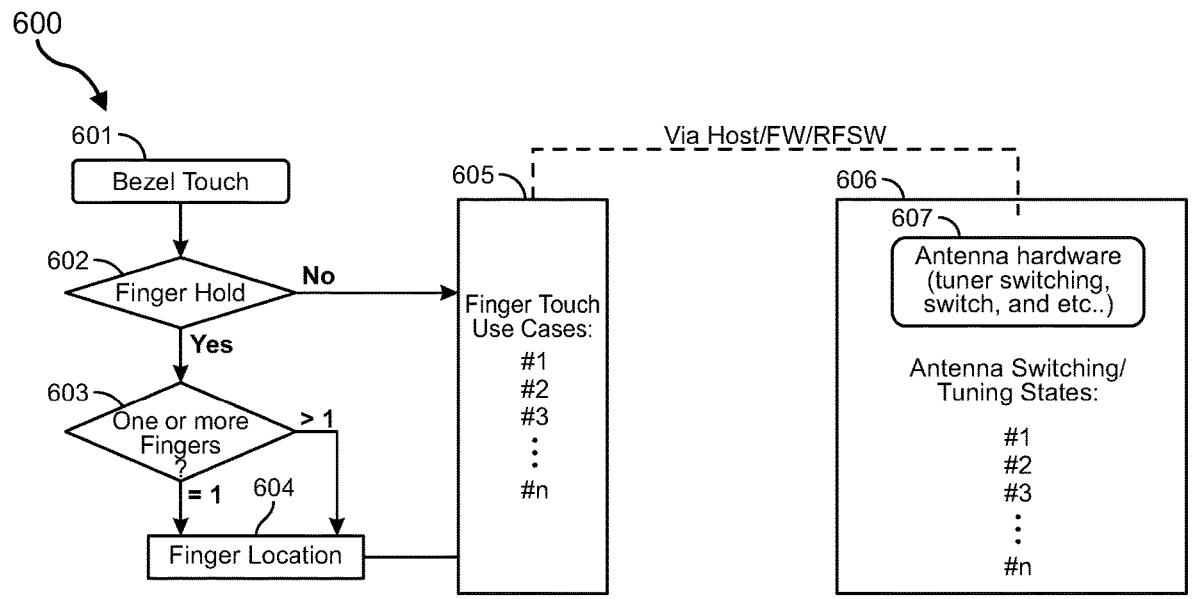
FIG. 6 illustrates a flowchart of a method for dynamically tuning an antenna architecture.
Figure 7A:
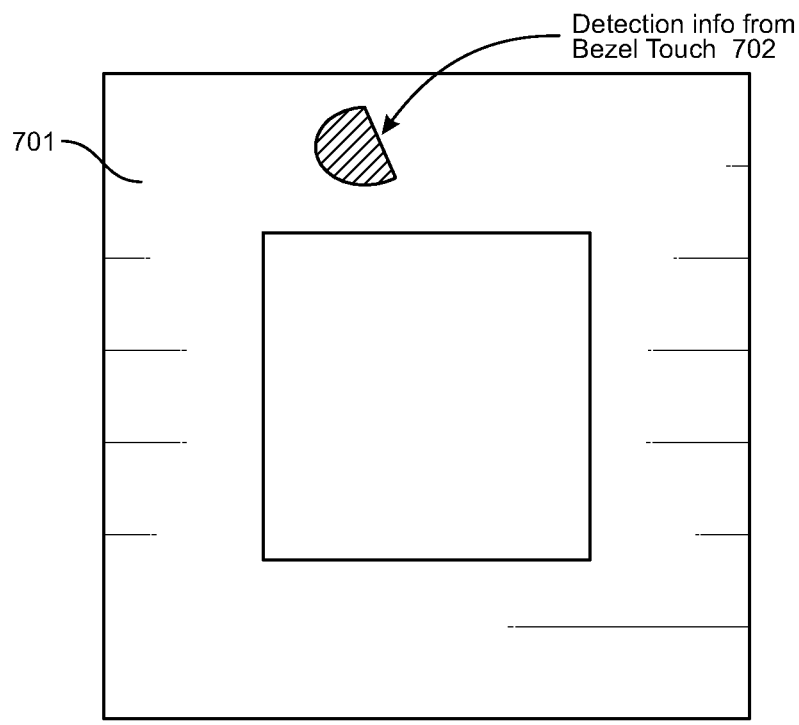
FIGS. 7A-7C illustrate embodiments in which bezel touches and display touches are implemented when determining how to dynamically tune an antenna architecture.
Figure 7B:
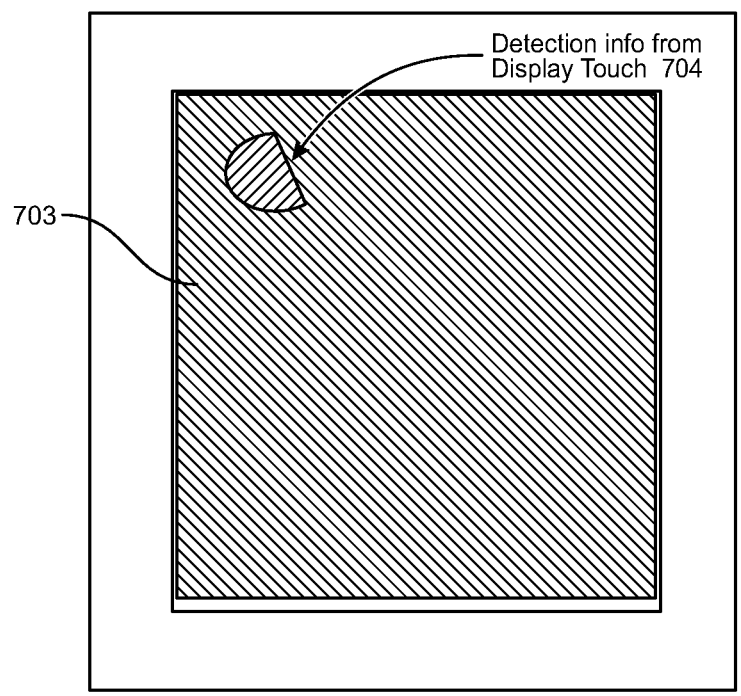
Figure 7C:
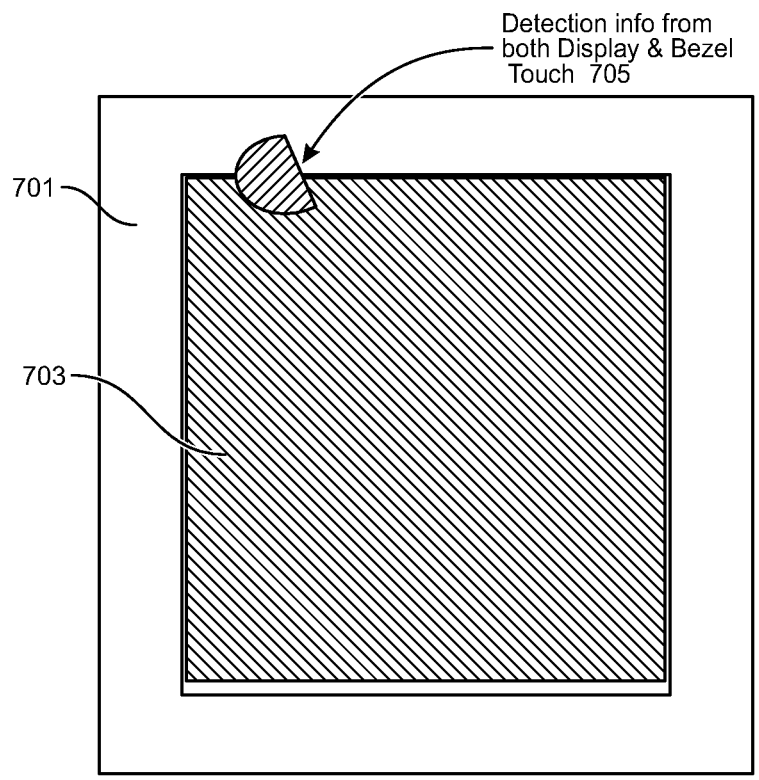
Figure 8:
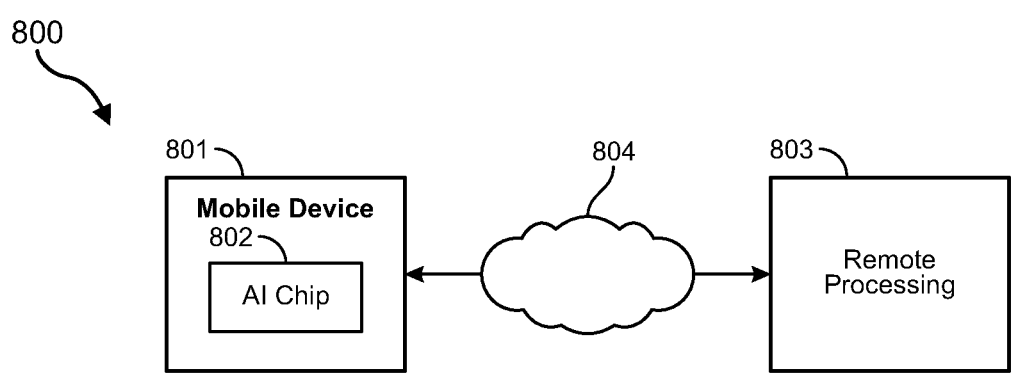
FIG. 8 illustrates an embodiment in which artificial intelligence processing may be performed on device, remotely, or a combination thereof.

FIGS. 6 and 7 illustrate embodiments in which touch inputs are received at different locations on a device. FIG. 6 illustrates an embodiment 600 of a flowchart outlining a process that may occur upon receiving different touch inputs. For instance, at 601, the device may receive a bezel touch input. The process may then determine whether the input is a touch and release or a touch and hold at 602. If "No," the process may be directed to finger touch use cases 605, of which one or more use cases may indicate what is to occur on a touch and release at a particular location on the bezel and/or on the touchscreen. If "Yes" at 602, the process may determine, at 603, whether one finger is involved or whether multiple fingers are involved. The location of the finger(s) may be determined at 604, and the location and number of fingers may be fed to finger touch use cases 605. These finger touch use cases may include options for many different touch inputs including touch detections from a bezel (e.g., touch detection 702 from bezel 701 of FIG. 7), touch detections from a touchscreen display (e.g., touch detection 704 from touchscreen 703 of FIG. 7), or touch detections from both a bezel and a touchscreen display (touch detection 705 from both bezel 701 and touchscreen 703).

Upon determining which finger touch use case is to be applied based on the type of touch or the number or location of touches, the process may communicate with antenna hardware 607 to switch between antennas, change tuning states, or make other antenna operational parameter changes. In some cases, the touch input may be from a single touch sensor such as the bezel or the touchscreen. In such cases, the decision as to which finger touch use cases to use may be selected based on the touch input from the bezel or from the touchscreen. In other cases, touch inputs may be received at both a bezel of the mobile electronic device and at a touchscreen of the device. In such cases, the finger touch use case may be selected based on both the bezel touch input and the touchscreen input. Thus, in these cases, antenna operational parameters may be changed based on both the touch input from the bezel and the touch input from the touchscreen. Either or both of the touch inputs may indicate a touch near antennas and, accordingly, the operation of those antennas may be altered to ensure optimum performance of each antenna.

In cases where multiple touch inputs are received from different touch sensors, the systems herein may prioritize which inputs are used when determining the specified operational parameters that are to be changed. Thus, in some cases, touch inputs on the bezel may be prioritized over touch inputs on the touchscreen. In at least some embodiments, the antennas near the bezel may be affected differently or more powerfully by the user's touch. Accordingly, indications of touch inputs on the bezel may be prioritized over touch inputs from other sensors when determining which antenna parameters to modify or when determining the extent to which the selected antenna parameters are modified. In some cases, the operational parameters of the antenna may be dynamically updated as changes or updates to the contextual information are received.

Thus, if any one or more pieces of contextual information (e.g., 401, 404, or 405 of FIG. 4D) changes in an update, the antenna parameters to be changed may be automatically identified and changed in response to receiving the updated contextual information. In this manner, the mobile electronic device may be personalized to each user according to the contextual information and, more specifically, to user-specific characteristics that are reflected in the contextual information (e.g., how tight or loose the user wears their device, where on their body the user wears the device (e.g., on their wrist, on their head, etc.), which applications the user repeatedly uses, etc.). As noted above, these dynamic changes may include changing substantially any operational parameters associated with any of the multiple antennas on the mobile device, including tuning the antennas, changing antenna feed characteristics, turning the various antennas off or on, switching between antennas, changing beamforming characteristics of the antenna, changing transmission power, changing gain, or changing S parameters of the antenna.

In some cases, the operational parameters associated with the antenna(s) on the mobile device may be changed based on the location of the antenna within the mobile electronic device. For instance, antennas may be positioned on different interior levels of a smartwatch (e.g., above or below a battery, above or below sensors, above or below electrically insulating layers, etc.). Thus, at least in some embodiments, the location of the antenna(s) within the device may be taken into account when determining which antenna operational parameters to change and by how much to change them. Still further, in some cases, the operational parameters associated with the antenna(s) on the mobile device may be changed based on what is being used as a radiating element for the antenna. In some cases, a PCB trace may be used as a radiating element. In other cases, a dedicated piece of metal may be used as a radiating element. Still further, in some cases, the bezel itself may function as a radiating element. In these cases, the operational parameters of the antenna(s) may be changed based on which element(s) are being used as radiating elements.

In one embodiment, a system may be provided that includes at least one physical processor and physical memory having computer-executable instructions that, when executed by the physical processor, cause the physical processor to perform the following: access various portions of contextual information including at least one touch input from a touch-based sensor on a mobile electronic device, determine, based on the contextual information, which of many different operational parameters associated with at least one antenna of the mobile electronic device are to be changed, and change the specified operational parameters associated with the at least one antenna on the mobile device according to the determination.

As mentioned above, the processor may be further configured to predict, based on the contextual information, which specified operational parameters are to be changed for the antenna of the mobile electronic device and then change the operational antenna parameters based on the prediction. In some embodiments, the prediction may be made using artificial intelligence (AI), machine learning (ML), neural networks, or a combination thereof. For instance, as shown in embodiment 800 of FIG. 8, the mobile electronic device 801 may include an AI chip or processor 802. The AI processor 802 may perform at least some of the processing when predicting which operational antenna parameters are to be changed.

For instance, the AI processor 802 may determine the device's current location using GPS coordinates. The AI processor may then determine which applications have been used in the past in that location, or which gestures have been performed in the past at that location, or which environmental changes typically occur in that location (e.g., cellular reception drops in power), or which other changes have happened in the past. The AI processor 802 may then use these past occurrences to predict future actions and appropriate antenna responses to those actions. Additionally or alternatively, the AI processor 802 may predict future actions, not based on past actions, but based on current environmental conditions including S parameters. The AI processor 802 may take this contextual information and generate predictions of how the device will be used and, based on predicted use, which antenna parameters are to be modified and by how much.

In some cases, predicting which operational antenna parameters are to be changed may include predicting when to switch between antennas, when to tune the antenna(s), when or how to change beamforming characteristics for the antenna(s), when or how to change antenna amplitude or phase, or when to make other changes. The predicted changes to the operational parameters may be based on predicted change in environment or predicted user behavior within an environment (e.g., which applications are likely to be used, or which locations on the bezel or touchscreen are likely to be touched). Still further, the predicted changes to the operational antenna parameters may be based on predicted actions that will be taken by a user in relation to the touch-based sensor(s). Any or all of these predicted actions or outcomes may be used to proactively switch antennas, proactively tune antennas, proactively change antenna feed characteristics, proactively change signal processing, or take other actions in anticipation of these predicted actions or outcomes.

In some embodiments, predictions performed using artificial intelligence or machine learning may be performed entirely or partially on a remote processing device 803. In such cases, the mobile electronic device 801 may communicate with the remote processing device 803 through computer networks such as the cloud 804. This remote processing may result in lookup tables that provide different predictions and associated antenna parameter changes. In cases where the prediction is performed at least partly on the remote processing device 803, the remote processing device may send one or more lookup tables to the mobile electronic device 801 so that the mobile device can determine which antenna parameters to apply simply using the received lookup table. This may greatly reduce the amount of processing performed on the mobile device, while still providing access to AI and ML predictions.

In some cases, the mobile device may perform some of the prediction processing on its own AI processor 802, while delegating a portion of the prediction processing to one or more remote processing devices. In such cases, the mobile electronic device 801 may then combine its own calculated predictions with the predictions of the remote processing device(s) (e.g., stored in a lookup table), determine which actions or outcomes are most likely, and then make changes to the operational antenna parameters accordingly. In this manner, predicted uses and predicted contextual information may even further personalize a device to a user, ensuring that regardless of how or where the user is using their device, the optimum antenna parameters may be automatically identified and applied.

EXAMPLE EMBODIMENTS

Example 1: A computer-implemented method may include accessing one or more portions of contextual information based on at least one touch input from a touch-based sensor on a mobile electronic device, determining, based on the contextual information, which of one or more specified operational parameters associated with at least one antenna of the mobile electronic device are to be changed, and changing the specified operational parameters associated with the at least one antenna on the mobile device according to the determination.

Example 2: The computer-implemented method of Example 1, wherein the touch-based sensor comprises a bezel of the mobile electronic device.

Example 3: The computer-implemented method of Example 1 or Example 2, wherein the touch-based sensor comprises a touchscreen of the mobile electronic device.

Example 4: The computer-implemented method of any of Examples 1-3, wherein the touch input is received at a bezel of the mobile electronic device, wherein a second touch input is received at a touchscreen of the mobile electronic device, and wherein the specified operational parameters that are to be changed are based on both the touch input and the second touch input.

Example 5: The computer-implemented method of any of Examples 1-4, wherein at least one of the touch input and the second touch input are prioritized when determining the specified operational parameters that are to be changed are based on both the touch input and the second touch input.

Example 6: The computer-implemented method of any of Examples 1-5, wherein the operational parameters of the antenna are dynamically updated as updates to the contextual information are received.

Example 7: The computer-implemented method of any of Examples 1-6, wherein the mobile electronic device is personalized to a specific user according to one or more user-specific characteristics that are part of the contextual information.

Example 8: The computer-implemented method of any of Examples 1-7, wherein changing the operational parameters associated with the antenna on the mobile device includes at least one of tuning the antenna, changing antenna feed characteristics, turning the antenna off or on, switching between antennas, changing beamforming characteristics, changing transmission power, changing gain, or changing S parameters.

Example 9: The computer-implemented method of any of Examples 1-8, wherein the operational parameters associated with the antenna on the mobile device are changed based on the location of the antenna within the mobile electronic device.

Example 10: The computer-implemented method of any of Examples 1-9, wherein the operational parameters associated with the antenna on the mobile device are changed based on what is being used as a radiating element for the antenna.

Example 11: A system may include at least one physical processor and physical memory comprising computer-executable instructions that, when executed by the physical processor, cause the physical processor to: access one or more portions of contextual information based on at least one touch input from a touch-based sensor on a mobile electronic device, determine, based on the contextual information, which of one or more specified operational parameters associated with at least one antenna of the mobile electronic device are to be changed, and change the specified operational parameters associated with the at least one antenna on the mobile device according to the determination.

Example 12: The system of Example 11, may further include predicting, based on the contextual information, which specified operational parameters are to be changed for the antenna of the mobile electronic device and changing the specified operational antenna parameters based on the prediction.

Example 13: The system of Example 11 or Example 12, wherein predicting which specified operational parameters are to be changed includes predicting at least one of when to switch between antennas, when to tune the at least one antenna, when or how to change beamforming characteristics, when or how to change antenna amplitude or phase.

Example 14: The system of any of Examples 11-13, wherein the predicted changes to the specified operational parameters are based on a predicted change in environment.

Example 15: The system of any of Examples 11-14, wherein the predicted changes to the specified operational parameters are based on a predicted action taken by a user in relation to the touch-based sensor.

Example 16: The system of any of Examples 11-15, wherein the prediction is performed using artificial intelligence including at least one of machine learning or neural networks.

Example 17: The system of any of Examples 11-16, wherein predictions performed using artificial intelligence are performed at least partially on the mobile electronic device.

Example 18: The system of any of Examples 11-17, wherein predictions performed using artificial intelligence are performed at least partially remotely, and wherein one or more lookup tables resulting from the remotely performed predictions are provided to the mobile electronic device.

Example 19: The system of any of Examples 11-18, wherein the mobile device performs the artificial intelligence-based prediction using the contextual information and using at least a portion of the one or more remotely generated lookup tables.

Example 20: A mobile electronic device that may include a non-transitory computer-readable medium comprising one or more computer-executable instructions that, when executed by at least one processor of a computing device, cause the computing device to: access one or more portions of contextual information based on at least one touch input from a touch-based sensor on a mobile electronic device, determine, based on the contextual information, which of one or more specified operational parameters associated with at least one antenna of the mobile electronic device are to be changed, and change the specified operational parameters associated with the at least one antenna on the mobile device according to the determination.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
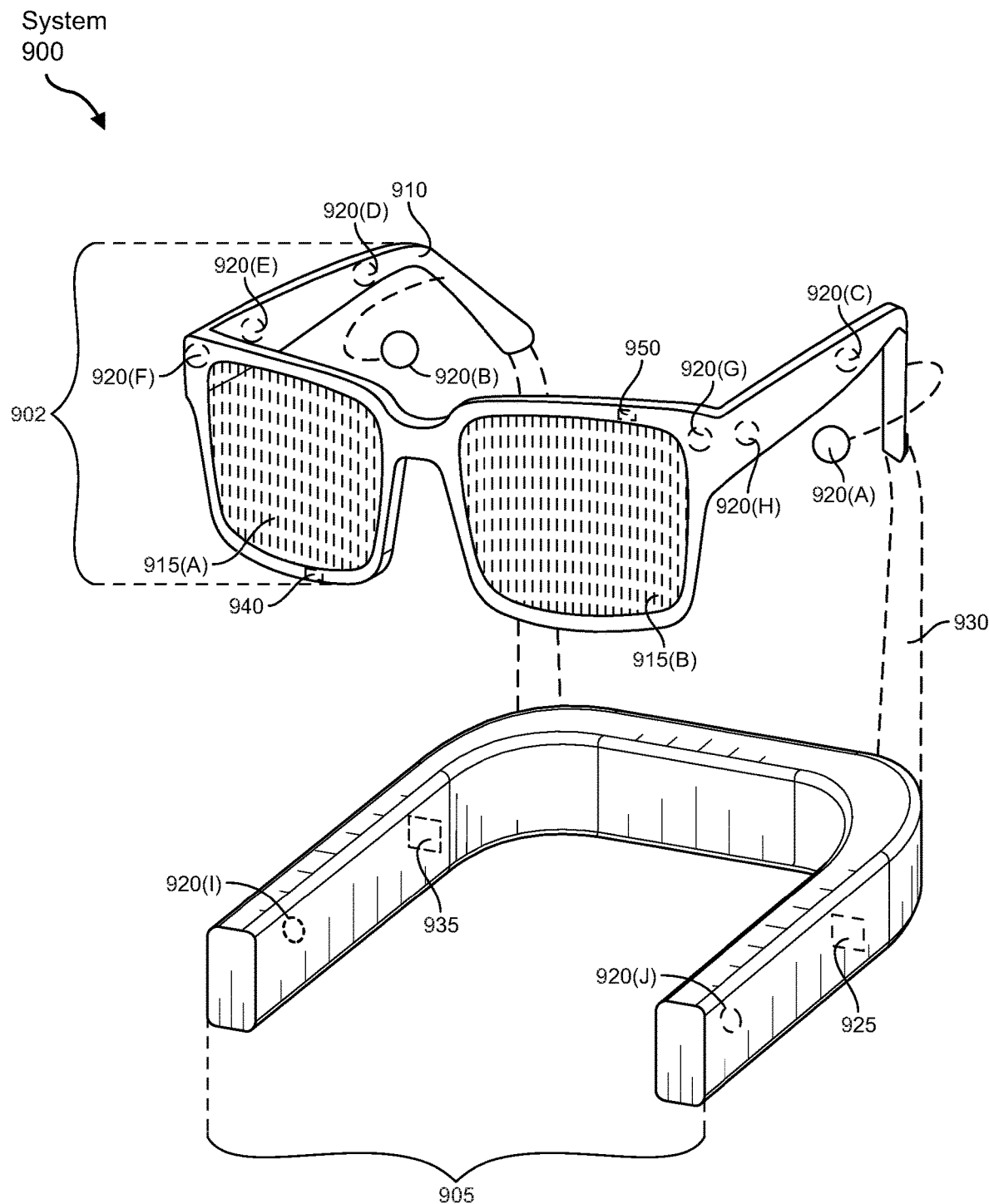
FIG. 9 is an illustration of exemplary augmented-reality glasses that may be used in connection with embodiments of this disclosure.
Figure 10:
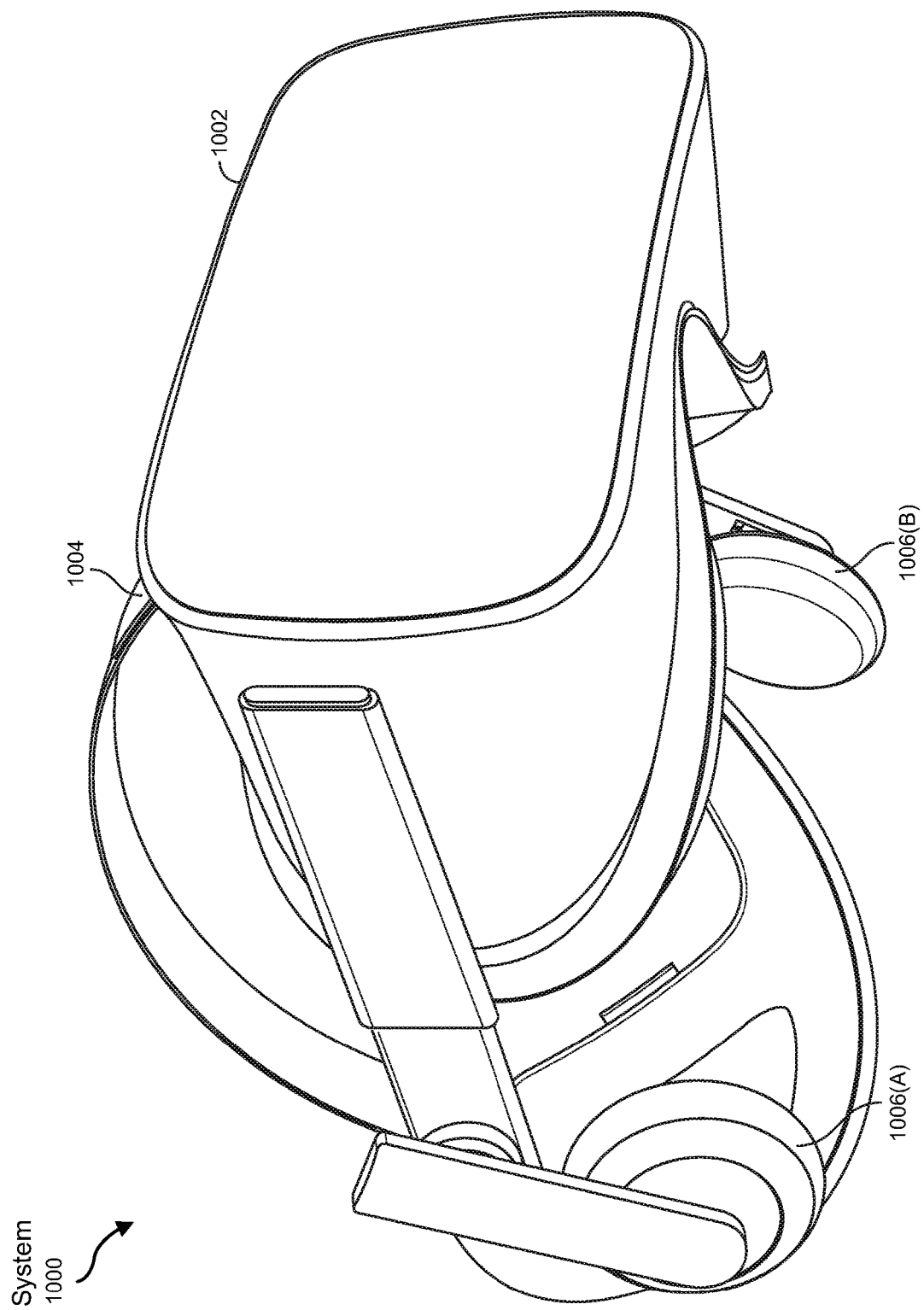
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium-ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Discs (CDs), Digital Video Discs (DVDs), and BLU-RAY discs), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
accessing one or more portions of contextual information based on at least one touch input from a touch-based sensor on a mobile electronic device, the contextual information indicating which portions of the mobile electronic device are being touched;
determining, based on the indication of which portions of the mobile electronic device are being touched, that at least one antenna is physically located within a specified distance of the portions of the mobile electronic device that are being touched;
determining, based on the contextual information and the determination of the at least one antenna's physical location, which of one or more specified operational parameters associated with the at least one antenna of the mobile electronic device are to be changed, wherein the determining includes predicting, based on the contextual information, which specified operational parameters are to be changed for the antenna; and
changing the specified operational parameters associated with the at least one antenna on the mobile electronic device based on the prediction.

2. The computer-implemented method of claim 1, wherein the touch-based sensor comprises a bezel of the mobile electronic device.

3. The computer-implemented method of claim 1, wherein the touch-based sensor comprises a touchscreen of the mobile electronic device.

4. The computer-implemented method of claim 1, wherein the touch input is received at a bezel of the mobile electronic device, wherein a second touch input is received at a touchscreen of the mobile electronic device, and wherein the specified operational parameters that are to be changed are based on both the touch input and the second touch input.

5. The computer-implemented method of claim 4, wherein at least one of the touch input and the second touch input are prioritized when determining the specified operational parameters that are to be changed are based on both the touch input and the second touch input.

6. The computer-implemented method of claim 1, wherein the specified operational parameters of the antenna are dynamically updated as updates to the contextual information are received.

7. The computer-implemented method of claim 6, wherein the mobile electronic device is personalized to a specific user according to one or more user-specific characteristics that are part of the contextual information.

8. The computer-implemented method of claim 1, wherein changing the operational parameters associated with the antenna on the mobile electronic device includes at least one of tuning the antenna, changing antenna feed characteristics, turning the antenna off or on, switching between antennas, changing beamforming characteristics, changing transmission power, changing gain, or changing S parameters.

9. The computer-implemented method of claim 7, wherein the operational parameters associated with the antenna on the mobile electronic device are changed based on the location of the antenna within the mobile electronic device.

10. The computer-implemented method of claim 7, wherein the operational parameters associated with the antenna on the mobile electronic device are changed based on what is being used as a radiating element for the antenna.

11. A system comprising:
at least one physical processor; physical memory comprising computer-executable instructions that, when executed by the physical processor, cause the physical processor to:
access one or more portions of contextual information based on at least one touch input from a touch-based sensor on a mobile electronic device, the contextual information indicating which portions of the mobile electronic device are being touched;
determine, based on the indication of which portions of the mobile electronic device are being touched, that at least one antenna is physically located within a specified distance of the portions of the mobile electronic device that are being touched;
determine, based on the contextual information and the determination of the at least one antenna's physical location, which of one or more specified operational parameters associated with the at least one antenna of the mobile electronic device are to be changed, wherein the determining includes predicting, based on the contextual information, which specified operational parameters are to be changed for the antenna; and
change the specified operational parameters associated with the at least one antenna on the mobile electronic device based on the prediction.

12. The system of claim 11, wherein predicting which specified operational parameters are to be changed includes predicting at least one of when to switch between antennas, when to tune the at least one antenna, when or how to change beamforming characteristics, when or how to change antenna amplitude or phase.

13. The system of claim 12, wherein the predicted changes to the specified operational parameters are based on a predicted change in environment.

14. The system of claim 12, wherein the predicted changes to the specified operational parameters are based on a predicted action taken by a user in relation to the touch-based sensor.

15. The system of claim 11, wherein the prediction is performed using artificial intelligence including at least one of machine learning or neural networks.

16. The system of claim 15, wherein predictions performed using artificial intelligence are performed at least partially on the mobile electronic device.

17. The system of claim 15, wherein predictions performed using artificial intelligence are performed at least partially remotely, and wherein one or more lookup tables resulting from the remotely performed predictions are provided to the mobile electronic device.

18. The system of claim 17, wherein the mobile electronic device performs the artificial intelligence-based prediction using the contextual information and using at least a portion of the one or more remotely generated lookup tables.

19. A mobile electronic device that includes a non-transitory computer-readable medium comprising one or more computer-executable instructions that, when executed by at least one processor of a computing device, cause the computing device to:
access one or more portions of contextual information based on at least one touch input from a touch-based sensor on a mobile electronic device, the contextual information indicating which portions of the mobile electronic device are being touched;

determine, based on the indication of which portions of the mobile electronic device are being touched, that at least one antenna is physically located within a specified distance of the portions of the mobile electronic device that are being touched;

determine, based on the contextual information and the determination of the at least one antenna's physical location, which of one or more specified operational parameters associated with at least one antenna of the mobile electronic device are to be changed, wherein the determining includes predicting, based on the contextual information, which specified operational parameters are to be changed for the antenna; and change the specified operational parameters associated with the at least one antenna on the mobile electronic device based on the prediction.

* * * * *